United States Patent
Gagliano et al.

(10) Patent No.: US 12,471,575 B2
(45) Date of Patent: Nov. 18, 2025

(54) CONCRETE WAVE ATTENUATING APPARATUS AND AN ASSEMBLY THEREOF FACILITATING FORMATION OF A VERTICAL OYSTER REEF AND METHOD OF FORMING A VERTICAL OYSTER REEF INCORPORATING AN ASSEMBLY OF CONCRETE WAVE ATTENUATING APPARATUSES

(71) Applicants: Coastal Environments, Incorporated, Baton Rouge, LA (US); Mark H. Gagliano

(72) Inventors: Sherwood M. Gagliano, Baton Rouge, LA (US); Mark H. Gagliano, Baton Rouge, LA (US)

( * ) Notice: Subject to any disclaimer, the term of this patent is extended or adjusted under 35 U.S.C. 154(b) by 925 days.

(21) Appl. No.: 17/198,981

(22) Filed: Mar. 11, 2021

(65) Prior Publication Data

US 2021/0251197 A1    Aug. 19, 2021

Related U.S. Application Data

(63) Continuation of application No. PCT/US2019/050583, filed on Sep. 11, 2019.
(Continued)

(51) Int. Cl.
*A01K 61/73*    (2017.01)
*A01K 61/54*    (2017.01)
(Continued)

(52) U.S. Cl.
CPC .............. *A01K 61/73* (2017.01); *A01K 61/54* (2017.01); *A01K 61/77* (2017.01); *E02B 3/046* (2013.01); *E02B 3/06* (2013.01)

(58) Field of Classification Search
CPC ........ A01K 61/54; A01K 61/73; A01K 61/77; Y02A 10/11; Y02A 10/26; E02B 3/046; E02B 3/06
See application file for complete search history.

(56) References Cited

U.S. PATENT DOCUMENTS

| 1,146,229 A | 7/1915 | Adamson |
| 2,319,170 A | 5/1943 | Toner |

(Continued)

FOREIGN PATENT DOCUMENTS

| FR | 2376623 | 8/1978 |
| FR | 2376623 A1 * | 8/1978 |

(Continued)

OTHER PUBLICATIONS

Song, Artificial Ground Reef Translation, Feb. 10, 2015 (Year: 2015).*

(Continued)

*Primary Examiner* — Joshua J Michener
*Assistant Examiner* — Nicole Paige MacCrate
(74) *Attorney, Agent, or Firm* — Blynn L. Shideler; Krisanne Shideler; BLK Law Group

(57) ABSTRACT

A concrete wave attenuating apparatus facilitating the formation of a vertical oyster reef includes: A) A concrete wave attenuating frame having i) a concrete frame top and a concrete frame bottom defining a periphery of the frame, each having corners and sides extending between the corners, ii) concrete corner posts extending generally vertically between generally aligned corners of the concrete frame top and the concrete fame bottom, iii) concrete sides between the concrete corner posts extending generally vertically between the generally aligned sides of the of the concrete frame top and the concrete fame bottom, a plurality of passages extending through the concrete sides; B) A space (Continued)

defined within the concrete wave attenuating frame, wherein the plurality of passages extend to the space; and C) optionally Cultch material within the space.

16 Claims, 4 Drawing Sheets

Related U.S. Application Data

(60) Provisional application No. 62/729,605, filed on Sep. 11, 2018.

(51) Int. Cl.
*A01K 61/77* (2017.01)
*E02B 3/04* (2006.01)
*E02B 3/06* (2006.01)

(56) References Cited

U.S. PATENT DOCUMENTS

| | | | |
|---|---|---|---|
| 3,294,061 A | 12/1966 | Hanks | |
| 3,316,881 A | 5/1967 | Fischer | |
| 3,430,607 A | 3/1969 | Derouen | |
| 3,702,599 A * | 11/1972 | Herolzer | A01K 61/54 |
| | | | 119/241 |
| 3,779,209 A | 12/1973 | Budge et al. | |
| 3,811,411 A | 5/1974 | Moeller | |
| 3,985,101 A | 10/1976 | Thompson | |
| 4,182,270 A | 1/1980 | Fourcher | |
| 4,186,687 A | 2/1980 | Gilpatric | |
| 4,317,429 A | 3/1982 | Leighton et al. | |
| 4,377,987 A | 3/1983 | Satre | |
| 4,438,725 A * | 3/1984 | O'Sullivan | A01K 61/54 |
| | | | 119/238 |
| 4,621,588 A * | 11/1986 | Harris | A01K 61/54 |
| | | | 119/241 |
| 4,710,057 A | 12/1987 | Laier | |
| 4,788,937 A | 12/1988 | Keyser | |
| 4,947,791 A | 8/1990 | Laier et al. | |
| 5,269,254 A | 12/1993 | Gagliano et al. | |
| 5,924,820 A | 7/1999 | Creter | |
| 6,024,050 A | 2/2000 | Rheault | |
| 6,186,702 B1 * | 2/2001 | Bartkowski | A01K 61/70 |
| | | | 119/221 |
| 6,464,429 B2 | 10/2002 | Moore | |
| 6,824,327 B1 * | 11/2004 | Walter | A01K 61/70 |
| | | | 119/221 |
| 6,830,411 B1 | 12/2004 | Amari | |
| RE42,259 E | 3/2011 | Campbell et al. | |
| 8,020,516 B2 | 9/2011 | Labra Reynolds | |
| 8,291,863 B2 | 10/2012 | Krone et al. | |
| 8,550,033 B2 | 10/2013 | Matthews et al. | |
| 9,339,017 B1 * | 5/2016 | Walter | E02B 3/046 |
| 2003/0077122 A1 | 4/2003 | Carnahan et al. | |
| 2003/0094141 A1 | 5/2003 | Davis | |
| 2003/0136349 A1 | 7/2003 | Hall | |
| 2003/0138296 A1 * | 7/2003 | O'Hare | E02B 3/06 |
| | | | 405/15 |
| 2009/0194217 A1 | 8/2009 | Filbert | |
| 2014/0193199 A1 | 7/2014 | Farrell, Jr. | |
| 2014/0270961 A1 | 9/2014 | Farrell, Jr. | |
| 2016/0144899 A1 | 5/2016 | Schnaufer et al. | |
| 2017/0055502 A1 * | 3/2017 | Gagliano | E02B 3/046 |
| 2017/0233965 A1 * | 8/2017 | Boasso | E02B 3/121 |
| | | | 405/20 |

FOREIGN PATENT DOCUMENTS

| | | | |
|---|---|---|---|
| JP | 2012187060 | 10/2012 | |
| KR | 20040849 | 2/2006 | |
| KR | 101492188 B1 * | 2/2015 | A01K 61/77 |
| WO | 2015175975 | 11/2015 | |
| WO | WO-2018104734 A1 * | 6/2018 | A01K 61/70 |
| WO | 2020055980 | 3/2020 | |

OTHER PUBLICATIONS

Nayar, K Nagappan, Production of oyster seed in a hatchery system, Aug. 24, 2015, http://eprints.cmfri.org.in/id/eprint/2640 (Year: 2015).*

* cited by examiner

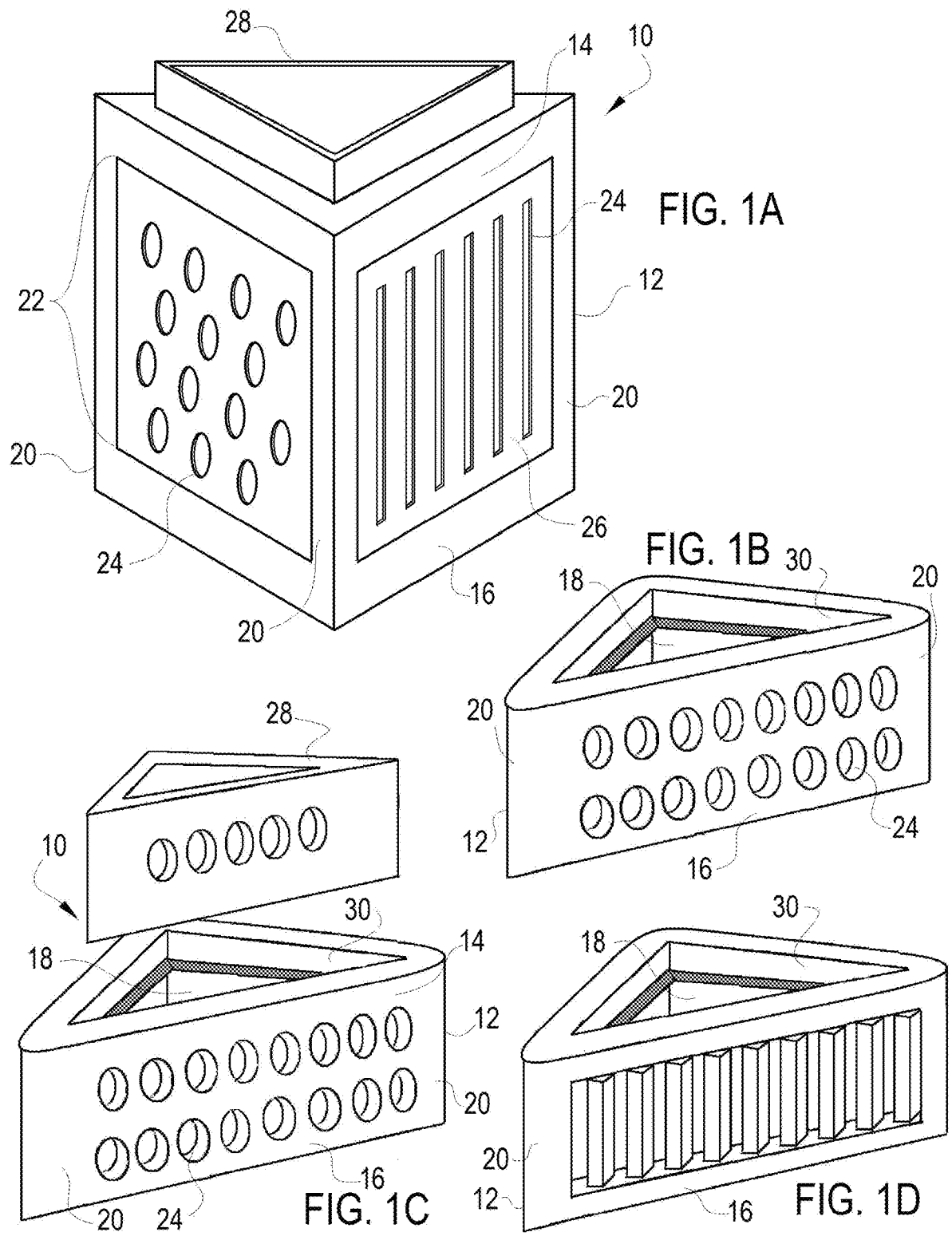

CONCRETE WAVE ATTENUATING APPARATUS AND AN ASSEMBLY THEREOF FACILITATING FORMATION OF A VERTICAL OYSTER REEF AND METHOD OF FORMING A VERTICAL OYSTER REEF INCORPORATING AN ASSEMBLY OF CONCRETE WAVE ATTENUATING APPARATUSES

RELATED APPLICATIONS

This application is a continuation of International Patent Application Ser. No. PCT/US2019/050583 titled "Concrete Wave Attenuating Apparatus and an Assembly Thereof Facilitating Formation of a Vertical Oyster Reef and Method of Forming a Vertical Oyster Reef Incorporating an Assembly of Concrete Wave Attenuating Apparatuses" filed Sep. 11, 2019 and published Mar. 19, 2020 as publication no WO 2020/055980, which application and publication are incorporated herein by reference in their entireties.

International Patent Application Ser. No. PCT/US2019/050583 claims priority to U.S. patent application Ser. No. 62/729,605 filed Sep. 11, 2018, titled "Concrete Wave Attenuating Apparatus and Assembly Thereof Facilitating Formation of a Vertical Oyster Reef and Method of Forming a Vertical Oyster Reef Incorporating an Assembly of Concrete Wave Attenuating Apparatuses" which application is incorporated herein by reference in its entirety.

BACKGROUND INFORMATION

1. Field of the Invention

The present invention relates to a concrete wave attenuating apparatus facilitating the formation of a vertical oyster reef, and assembly of such apparatuses and associated methods for forming a vertical oyster reef.

2. Background Information

In one context, this application is related to advancing the vertical oyster reef concepts the applicant disclosed in International Patent Application Serial Number PCT/US15/31148 filed May 15, 2015 and which published on Nov. 19, 2015 as W02015-175,975; and in related continuing patent application Ser. No. 15/351,807 filed Nov. 15, 2016 and which published on Mar. 2, 2017 as 2017-005502, which above publications are incorporated herein by reference.

The applicant's prior '502 publication and '975 publication teach a shoreline restoration method that utilizes an assembly of a plurality of apparatuses facilitating the formation of a vertical oyster reef. Each apparatus disclosed therein includes a rod frame and a plurality of individual mesh bags are positioned between an inner and an outer frame. The inner and outer frames include top and bottom frame portions and a plurality of side support frame members extending there between. Each individual mesh bag is aligned with at least one outer side support frame member and at least one inner side support frame member and wherein each individual mesh bag is coupled to an adjacent mesh bag. A plurality of cross ties extends between the inner frame and the outer frame and cultch material fills each individual mesh. The shoreline restoration method promotes shell accumulation and expands the tidal zone.

The shoreline restoration method disclosed in applicant's prior '502 publication and '975 publication rely upon the fact that once fully established and mature, the vertical oyster reefs will effectively dissipate wave energy, acting as a breakwater, stabilize bottom sediments and reduce erosion. One drawback with the system disclosed in applicant's prior '502 publication and '975 publication is that prior to the establishment and maturation of the vertical oyster reef (via the apparatuses to facilitate the same), there is minimal wave attenuation. Further, in select environments, excessive wave energy can inhibit and/or slow the establishment, growth and maturation of the vertical oyster reef. In harsh or severe wave environments the wave energy can even completely prevent the establishment and growth of the vertical oyster reef. These limitations can hinder the implementation of the systems disclosed in the '502 publication and '975 publication.

A detailed background on the need for facilitating the vertical oyster reef growth is outlined in applicant's prior '502 publication and '975 publication including discussion of various rehabilitation projects and organizations. An abbreviated version is repeated herein. The Eastern Oyster (*Crassostrea virginica*), AKA the American Oyster, Atlantic Oyster, Common Oyster, and Virginia Oyster, is native to the southeastern United States and lives in estuaries and marine coastal environments. A large number of oysters often join together forming an oyster reef, also referred to as oyster bed or oyster mat. Once attached to a surface, oysters will stay there for the remainder of their lives. A vertical oyster reef represents an oyster bed which extends vertically from the sea bed. In addition to oyster habitat development, the vertical oyster reef allows for efficient erosion control, rapid sediment accumulation and provides a habitat for other aquatic life. These "ancillary" benefits to the vertical oyster reef sometimes become the driving force in the implementation of the vertical oyster reef in rehabilitation projects, with the traditional oyster reef benefits becoming "ancillary".

Oyster reefs are an important resource for marine habitat and ecosystems providing an large number of ecological, economical and recreational benefits to the environment. The Eastern Oyster acts as a "keystone species" by filtering estuaries and maintaining healthy, coastal ecosystems. Unfortunately, oyster populations have greatly declined within the last century, which has been attributed to factors such as over-harvesting, dredging, increased sedimentation, invasive species, pollution, man-made global warming and disease. In response to this decline, many oyster restoration projects have been put into place throughout the coastal United States. Anne Birch, marine program manager for The Nature Conservancy in Florida states that "Oysters are the quiet, unsung heroes of our estuaries, working hard every day to protect our coasts, clean our waters, feed and shelter fish, birds, crabs, shrimp and other wildlife. When we help to restore and conserve oyster habitat and support the fishery we're also helping our estuaries and our coastal communities flourish." The projects develop a long-term strategy of sustained productivity for oyster reefs and restore the ecological role they provide to nearby reef habitats.

The following are some specific project examples in the United States. The Chesapeake Bay Native Oyster Recovery Program in Virginia is the restoration and rehabilitation of reef habitat to provide for self-sustaining native oyster populations and associated fish and wildlife habitat within the Chesapeake Bay watershed in Virginia with the lead federal agency being the U.S. Army Corps of Engineers and the non-federal sponsor being the Virginia Marine Resources Commission. Florida began "The Oyster Reef Restoration" project in June 2009 to restore the oyster habitat in the St. Lucie and Loxahatchee Estuaries, two of the largest brackish water systems on the east coast of Florida, where over the last 50 years oyster populations have declined by as much as 75%. In Georgia the "Generating Enhanced Oyster Reefs in Georgia's Inshore Areas (G.E.O.R.G.I.A.)" is a volunteer-based program for enhancing stewardship and public awareness of Georgia's oyster reef habitat. In South Carolina the "South Carolina Oyster Restoration and Enhancement (SCORE)" is another volunteer oyster restoration movement with sites that span approximately 200 miles (320 km). In North Carolina, the Citizens' Oyster Gardening Project (COGP) is an environmental demonstration project that encourages oyster gardening aimed to reestablish populations of native Eastern Oysters in North Carolina. Along the coast of Southern California, the EPA, Orange County Coast keeper and California Coastal Commission recognized that a large scale habitat restoration of oyster beds represented a primary method for improving degraded marine ecosystems and the Long Beach Management Group has assisted in designing the Alamitos Bay Native Oyster Restoration Project.

The patent literature has also described solutions to the restoration of oyster beds and to related materials. The applicant's earlier prior work represents a key effective tool in this effort and is disclosed in U.S. Pat. No. 5,269,254, which is incorporated herein by reference. The '254 patent discloses a method for forming an vertical oyster reef which includes setting seed oysters on cultch material, placing the cultch material containing the seed oysters in water permeable panels to form a vertical permeable wall of cultch material through which water may flow, and placing the panels in water having favorable conditions for oyster growth. The apparatus includes water permeable panels for holding cultch material in a vertical permeable wall to expose the entire column or wall of cultch to water having favorable conditions for oyster growth, and blocks formed from the panels. The solution of the '254 patent, like the solution outlined in Applicant's prior '502 publication and '975 publication, does not yield wave attenuation benefits until the establishment of the oyster reef and this can limit the establishment and growth of the oyster reef in select environments, which can effectively limit the application area of this solution.

U.S. Pat. No. 6,464,429, which is incorporated herein by reference, discloses an artificial reef module for coral reef remediation which includes a central body having an upper settling plate, a middle settling plate, and a lower settling plate. Extending from the central body is a plurality of branching tines that allegedly closely replicates the appearance of natural branching coral. Over time the individual artificial reef modules for coral reef remediation would slowly degrade and allow the tines to break off. This degradation allegedly closely approximates the fragmentation that occurs with natural branching coral.

U.S. Pat. RE42,259 (originally 7,144,196), which is incorporated herein by reference, discloses an apparatus and method of reducing the effects of hydrodynamic forces of waves and water currents in coastal environments (e.g., oceans, and coastal, river, lake, and reservoir banks). The apparatus is an "oyster-break" having two basic designs adapted to allow for the attachment of oysters and other "bio-fouling marine organisms", using the least amount of material. In one embodiment, the oyster-break comprises a support structure and plurality of slats (i.e., relatively planar sections or surfaces) having growth layers made from tubing coated with a material capable of inducing a marine organism attachment and growth. In another embodiment, the oyster-break comprises a plurality (e.g., two, three, four, five, six, etc.) of growth layers of regular polygonal-shaped members made from a material capable of inducing aquatic sessile organism attachment and growth that when stacked, form a relatively portable, breakwater module.

U.S. Pat. No. 8,020,516, which is incorporated herein by reference, discloses a device for the sea-based culture of sea urchins and abalones which includes four braces having a plurality of parallel and equidistant guides for the installation of a plurality of vertically inserted plates, forming spaces between the plates that permit housing sea urchins or abalones on both faces of the plates. At the bottom of the device, a horizontal tray holds algae for feeding sea urchins and the abalones; wherein, both the plurality of plates and the tray are enclosed in an elongated mesh.

U.S. Pat. No. 8,291,863, which is incorporated herein by reference, discloses a transportable hinged device for colonizing and harvesting invertebrate animals in proximity to a floor of a body of water which includes at least two quadrangular frames, each of which include a trapping surface.

U.S. Pat. No. 8,550,033, which is incorporated herein by reference, discloses a method for establishing a clam bed includes raising clam larvae in a captive environment in which they are provided with adequate food and habitat requirements, and kept isolated from natural predators.

Korean Patent Publication 20040849 discloses a "domed oyster shell" in which "a plurality of the lower frame is connected to the installation" to "form the infrastructure of the polygon to be seated on the sea floor", wherein inside the "lower structure has a plurality of inner frames of the lower frame" and "a plurality of outer frame is provided obliquely so as to connect the upper end of the lower frame" and the vertical frame forms a generally truncated dome wherein the top oyster shell storage body is provided in the plurality of skeleton frame connection to form a polyhedron having a predetermined height. The peripheral portions has a metal mesh installed to prevent the oyster shell is leakage.

Additionally U.S. Pat. Nos. 6,824,327, 6,830,411, 6,024,050, 6,186,702, 5,924,820, 4,947,791, 4,788,937, 4,710,057, 4,377,987, 4,317,429, 4,186,687, 4,182,270, 3,985,101, 3,811,411, 3,779,209, 3,702,599, 3,430,607, 3,316,881, 3,294,061, 2,319,170, and 1,146,229 and U.S. Patent Publications 2014-0270961, 2014-0193199, 2009-0194217, 2003-0136349, 2003-0094141, and 2003-0077122 are also of general interest and are incorporated herein by reference.

It is one object of the present invention to provide oyster bed restoration efforts with better, efficient, cost effective, easy to implement apparatus and associated methods for facilitating the formation of a vertical oyster reef. It is one object of the present invention to provide methods for shoreline rehabilitation with induced vertical oyster reefs.

SUMMARY OF THE INVENTION

This invention is directed to a cost effective, efficient, and easy to implement concrete wave attenuating apparatus, assemblies thereof and associated methods for facilitating the formation of a vertical oyster reef. This invention is also directed to cost effective, efficient methods for shoreline rehabilitation utilizing induced vertical oyster reefs and associated lagoons incorporating an assembly of concrete wave attenuating apparatuses facilitating formation of a vertical oyster reef.

One embodiment of the present invention provides an apparatus facilitating the formation of a vertical oyster reef comprising: A) a concrete wave attenuating frame having i) a concrete frame top and a concrete frame bottom defining a periphery of the frame, each having corners and sides extending between the corners, ii) concrete corner posts extending generally vertically between generally aligned corners of the concrete frame top and the concrete frame bottom, iii) concrete sides between the concrete corner posts extending generally vertically between the generally aligned sides of the of the concrete frame top and the concrete fame bottom, a plurality of passages extending through the concrete sides; B) a cultch containment space defined within the concrete wave attenuating frame, wherein the plurality of passages extend to the cultch containment space; and C) cultch material within the cultch containment space.

The apparatus facilitating the formation of a vertical oyster reef according to one embodiment of the invention provides that the frame is generally triangular in horizontal cross section and includes three concrete corner posts.

The apparatus facilitating the formation of a vertical oyster reef according to one embodiment of the invention provides wherein each concrete side is formed by a plurality of vertical concrete louvers extending between the concrete frame top and the concrete frame bottom, and wherein the plurality of passages are formed adjacent the vertical concrete louvers.

The plurality of vertical concrete louvers of each concrete side may be formed in an inner row and a staggered outer row. The plurality of passages formed adjacent the vertical concrete louvers may be formed as non-linear passages. The plurality of vertical concrete louvers may extend substantially at an angle to a plane of the concrete side, such as perpendicular thereto.

The apparatus facilitating the formation of a vertical oyster reef according to one embodiment of the invention may further include a plurality of individual mesh bags within the cultch containment space and containing the cultch material.

The apparatus facilitating the formation of a vertical oyster reef according to one embodiment of the present invention may provide wherein a flow area of each side is 20-75%, wherein the flow area is a sum total area of a minimum flow area of each passage of the side divided by a total face surface of the side times 100%.

The apparatus facilitating the formation of a vertical oyster reef according to one embodiment of the present invention may provide wherein the apparatus is configured for vertical stacking and includes a top extension member coupled to the frame top and configured to be received within the frame bottom of a vertically adjacent apparatus.

The apparatus facilitating the formation of a vertical oyster reef according to one embodiment of the present invention may provide wherein the concrete frame includes material integrated therein to perpetuate the growth of oysters, bryozoans, barnacles, or other marine organisms including at least one of oyster shell, fossilized sea shell, or fossilized crushed corral, limestone, crushed concrete and/or recycled rubber components.

The apparatus facilitating the formation of a vertical oyster reef according to one embodiment of the present invention may further include a concrete base with a raised triangular area configured to be received in the frame bottom.

Another aspect of the present invention provides a method of forming a vertical oyster reef incorporating a concrete wave attenuating apparatus comprising the steps of: A) providing a concrete wave attenuating frame having i) a concrete frame top and a concrete frame bottom defining a periphery of the frame, each having corners and sides extending between the corners, ii) concrete corner posts extending generally vertically between generally aligned corners of the concrete frame top and the concrete fame bottom, iii) concrete sides between the concrete corner posts extending generally vertically between the generally aligned sides of the of the concrete frame top and the concrete frame bottom, a plurality of passages extending through the concrete sides, and with a space defined within the concrete wave attenuating frame, wherein the plurality of passages extend to the space; B) positioning the frame and cultch material within an oyster hatchery tank during an incubation period; C) propagating live oyster larvae from brood stock oysters within the hatchery tank and feeding the larvae a mixture of algae during the incubation period until the larvae are mature enough to be set on the frame; D) removing the frame and set larvae assembly unit from the hatchery tank following the incubation period and placing the frame in a marine environment suitable to support an oyster reef.

Another aspect of the invention provides an assembly facilitating the formation of a vertical oyster reef including A) a plurality of concrete wave attenuating frames, each frame having i) a concrete frame top and a concrete frame bottom defining a periphery of the frame, each having corners and sides extending between the corners, ii) concrete corner posts extending generally vertically between generally aligned corners of the concrete frame top and the concrete fame bottom, iii) concrete sides between the concrete corner posts extending generally vertically between the generally aligned sides of the of the concrete frame top and the concrete fame bottom, a plurality of passages extending through the concrete sides, iv) a space defined within the concrete wave attenuating frame, wherein the plurality of passages extend to the space; and B) a coupler connecting the plurality of concrete wave attenuating frames in a desired orientation.

Another aspect of the invention provides a process forming an apparatus facilitating the formation of a vertical oyster reef comprising the steps of: A) forming an integral one-piece support rod sub-frame including a rods forming a closed loop top sub-frame, rods forming a closed loop bottom sub-frame and substantially vertically extending rods coupled between the top sub-frame and the bottom sub-frame; and B) encapsulating the sub-frame in concrete. The process forming an apparatus facilitating the formation of a vertical oyster reef according to this aspect of the invention invention may provide wherein the encapsulation step forms i) a concrete frame top and a concrete frame bottom defining a periphery of the frame, each having corners and sides extending between the corners, ii) concrete sides extending generally vertically between the generally aligned sides of the of the concrete frame top and the concrete frame bottom, iii) a plurality of passages extending through the concrete sides, and iv) a space defined within the concrete wave attenuating frame, wherein the plurality of passages extend to the space.

These and other aspects of the present invention will be clarified in the description of the preferred embodiment of the present invention described below in connection with the attached figures in which like reference numerals represent like elements throughout.

DESCRIPTION OF THE PREFERRED EMBODIMENTS

FIG. 1A is a perspective schematic view of a composite of two embodiments of an apparatus facilitating the formation of a vertical oyster reef according the present invention.

FIG. 1B-C are perspective schematic views of another embodiment of an apparatus facilitating the formation of a vertical oyster reef according the present invention.

FIG. 1D is a perspective schematic view of another embodiment of an apparatus facilitating the formation of a vertical oyster reef according the present invention.

FIGS. 2A-H are cross sectional plan schematic views of various louver embodiments of an apparatus facilitating the formation of a vertical oyster reef according the present invention.

FIGS. 3A-C are schematic top plan views of various embodiments of assemblies of apparatuses facilitating the formation of a vertical oyster reef according the present invention.

DESCRIPTION OF THE PREFERRED EMBODIMENTS

Figure 2A:
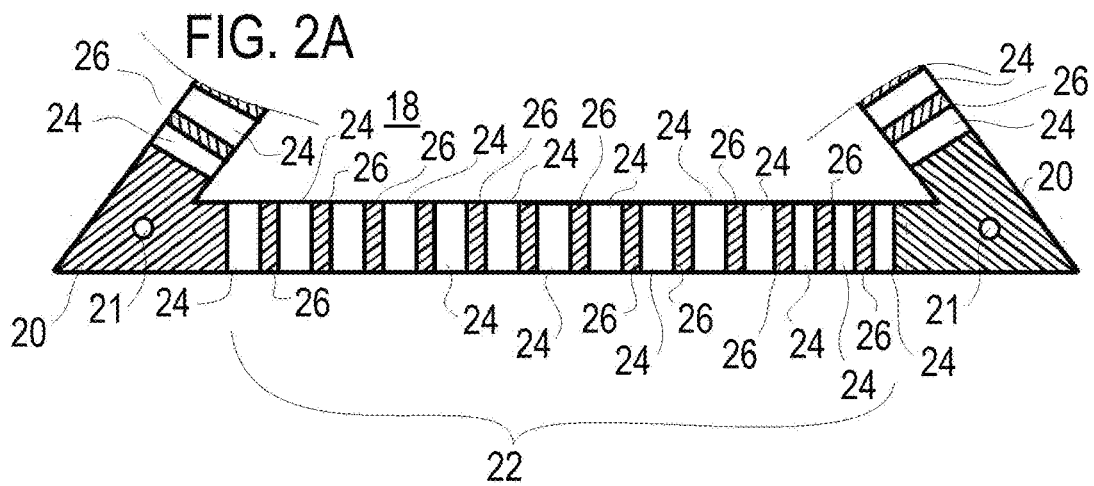
Figure 2B:
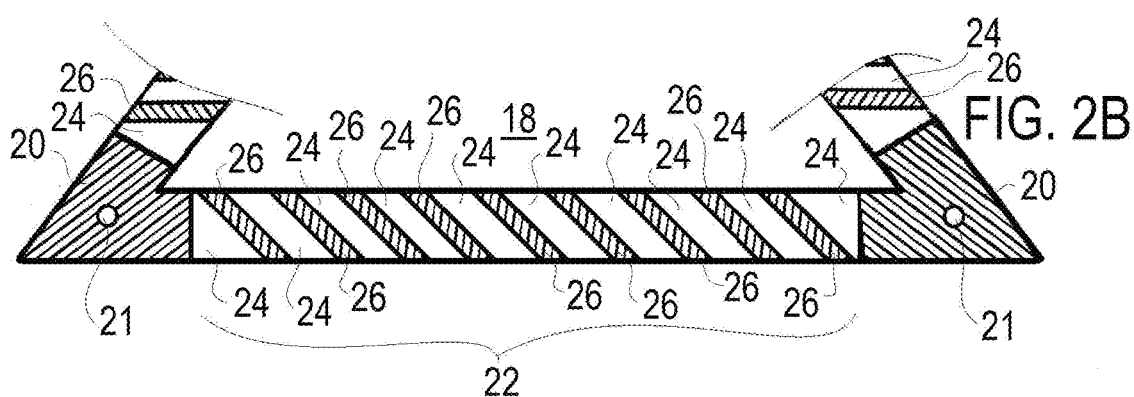

Concrete Apparatus 10 Facilitating the Formation of a Vertical Oyster Reef

This invention, in one aspect thereof, is directed to a cost effective, efficient, apparatus 10 facilitating the formation of a vertical oyster reef as shown in FIGS. 1A-D. The apparatus 10 comprises: A) a concrete wave attenuating frame 12 having i) a concrete frame top 14 and a concrete frame bottom 16 defining a periphery of the frame 12, each having corners and sides extending between the corners, ii) concrete corner posts 20 extending generally vertically between generally aligned corners of the concrete frame top 14 and the concrete frame bottom 16, iii) concrete sides 22 between the concrete corner posts 20 extending generally vertically between the generally aligned sides of the of the concrete frame top 14 and the concrete fame bottom 16, a plurality of passages 24 extending through the concrete sides 22; B) a space 18 defined within the concrete wave attenuating frame 12, which may include cultch material 40 (within bags 42), wherein the plurality of passages 24 extend to the space 18; and, optionally, C) cultch material 40 within the space 18 (which if present the space 18 may be referenced as a cultch containment space 18).

Concrete has had extensive use as construction material for seawalls, jetties, groins, breakwaters, bulkheads, and other structures exposed to sea water. The performance record has generally been good. Concrete within the meaning of this application broadly defines a composite of at least aggregate, such as rock, sand, or gravel and a binding agent such as cement, in particular type V cement with 5 percent C3A. Some concrete mixes have been designed to match the formulation of oyster shells to facilitate oyster growth and these may also be used. For example see CaC03 Brand concrete mix from Grow Oyster Reef, LLC, which is a "shell-less" concrete mix. Contrary to this specific "shell-less" mix, the present invention actually sees an advantage to incorporating shells into the concrete as discussed below, but selecting a binder for the cement or including other non-detrimental additives that promotes, or at least does not inhibit, oyster growth is advantageous as long as it does not have a deteriorating effect on the concrete's strength and durability. Concrete in this application includes spray-able versions such as known as gunite and shotcrete.

Additionally concrete forming the frame 12 may further include additional aggregate material, also referenced as integrated cultch material 40, integrated therein to perpetuate the growth of oysters, bryozoans, barnacles, or other marine organisms. The integrated cultch material 40 includes at least one of oyster shell, fossilized sea shell, or fossilized crushed corral, limestone, crushed concrete, and/or recycled rubber components. Conventional concrete manufacturing techniques can be used to facilitate exposure of the integrated material 40 without negatively effecting the strength of the concrete frame 12.

Cultch material in general is defined as material laid down on oyster grounds to furnish points of attachment for the spat. Traditional concrete forming the frame 12 would broadly fall within the definition of cultch material as it clearly forms an attachment point for spat, which is an intended part of the point of the present invention. However cultch material 40 within the meaning of this specification will define the additional loose material 40 in the space 18 (possibly within bags 42), and/or the additional aggregate material 40 in the concrete integrated therein (integrated material 40) to perpetuate the growth of oysters, bryozoans, barnacles, or other marine organisms The apparatus 10 facilitating the formation of a vertical oyster reef according the preferred embodiment provides the frame 12 is generally triangular in horizontal cross section and includes three concrete corner posts 20. "Horizontal" herein is a relative orientation and is generally parallel to the supporting ground or floor, when in actual practice there may be a slight incline to the supporting ground of the apparatus 10.

An equilateral triangle 12 is preferred because such structure allows any corner or side to be used in orientating the apparatus 10 in location. Flat sides are shown but a slight bow or curvature to the side may also be used, with a slight bow or curvature meaning that the radius of curvature would exceed the distance from the opposing apex (opposite corner) to a line connecting the other two corners. The equilateral triangular shape of the frame 12 (in plan or top view as shown) provides a modular configuration for the apparatus 10 that allows a plurality of the apparatuses 10 to be easily implemented into larger modular assemblies 100 easily placed into larger reef constructions, while still providing for acute angled wave breaking apexes that can be positioned to face, and to better withstand, wave energy.

An alternative to the triangle shown for the frame 12 is a diamond shape that yields two sharp corners and two shallower angle corners, whereby the user can have two angled wave facing sides for distinct options in use.

As noted the concrete corner posts 20 extend generally vertically between generally aligned corners of the concrete frame top 14 and the concrete fame bottom 16. "Vertical" herein is a relative term and means perpendicular to a supporting surface of the apparatus 10 and perpendicular to horizontal as used herein. Extending "generally vertically" defines that with the frame 12 on an actual horizontal surface the posts 20 are within 10 degrees and preferably within 5 degrees of vertical. The corners of the top 14 and bottom 16 are generally aligned within the meaning of this application when the coupling corner post 20 is generally vertical. It is anticipated that the apparatus 10 may be tapered inwardly by up to 10 degrees, with an inward angle for the posts 12 and sides 22 yielding a stable apparatus 10. The posts 20 will generally have a width of at least 4" (10.2 centimeters) along each side 22 of the frame 12 and a depth of at least 4" (10.2 centimeters) perpendicular to each side 22 of the frame 12.

As noted the concrete sides 22 are the portion of the apparatus 10 between the concrete corner posts 20 extending generally vertically between the generally aligned sides of the concrete frame top 14 and the concrete fame bottom 16.

The apparatus 10 facilitating the formation of a vertical oyster reef according to an alternative embodiment of the present invention provides wherein the plurality of passages 24 are formed in a grid pattern on each concrete side 22, such as shown on the left side of the composite design of FIG. 1A and shown in FIGS. 1B and C.

FIG. 1A is a perspective schematic view of a composite of two embodiments of an apparatus 10 facilitating the formation of a vertical oyster reef according the present invention, because in general the apparatus 10 will have the same side 22 and passage 24 configuration along each side 22. However nothing prevents the construction of the apparatus 10 of the invention with each side 22 having a distinct or unique formation of the passages 24 as shown in the composite version of FIG. 1A.

A flow area measurement is a helpful measure of proper arrangement for the passages 24. The passages 24 are designed to allow water to flow through the side 22, and effectively through the apparatus 10, and are believed to facilitate growth of the oyster reef. The apparatus 10 facilitating the formation of a vertical oyster reef according to one embodiment of the invention provides a flow area of each side 22 which is 20-75%. The flow area is calculated as a sum total area of a minimum flow area of each passage 24 of the side 22 divided by a total face surface of the side 22 times 100%. The face surface of the side 22 is the area bounded by and including the side posts 20 and the frame top 14 and the frame bottom 16 on one side 22. Although the flow area measurement is important for the "grid" design of the FIGS. 1B-C embodiment, but in addition the effective mesh screen rating (generally the effective area of the individual passages 24) of the grid pattern of passages 24 must be sufficient to promote growth, such as, for example, to minimize unwanted migration of loose cultch material 40, if used, from the cultch containment space 18, although a more tortuous path for the individual passages 26 also allows for a greater mesh screen rating of the grid pattern.

Louver Type Apparatuses 10

The apparatus 10 facilitating the formation of a vertical oyster reef according to one embodiment has wherein each concrete side is formed by a plurality of vertical concrete louvers 26 extending between the concrete frame top 14 and the concrete frame bottom 16, and wherein the plurality of passages 24 are formed as the space adjacent the vertical concrete louvers 26 extending to the hollow interior space 18. FIG. 1D and the right side of the composite illustration of FIG. 1A show this configuration, while FIGS. 2A-H show a wide variety of specific louver 26 designs within the present invention. As shown in the variety of examples illustrated in FIGS. 2A-H, the term louver 26 is relatively broad and the elements 26 can take a wide variety of configurations.

Each louver 26 in the embodiments of FIGS. 2A and B are formed as a flat slat or flat strip of concrete extending in a longitudinal direction generally vertically from the concrete frame top 14 to the concrete frame bottom 16. The flat slat has a face surface that is generally angled to a plane of the side 22 (aka the plane of the face of the side 22), perpendicular thereto for the embodiment of FIG. 2A and be angled or slanted (like louvered doors or windows) in the embodiment of FIG. 2B. If the louvers 26 are angled relative to the plane of the side 22 they are in and adjacent louvers 26 overlap, then in a side elevational view of the side 22 the passaged 24 are not (easily) visible as the overlapped louvers 26 would be viewed as a solid or uninterrupted structure.

Figure 2C:
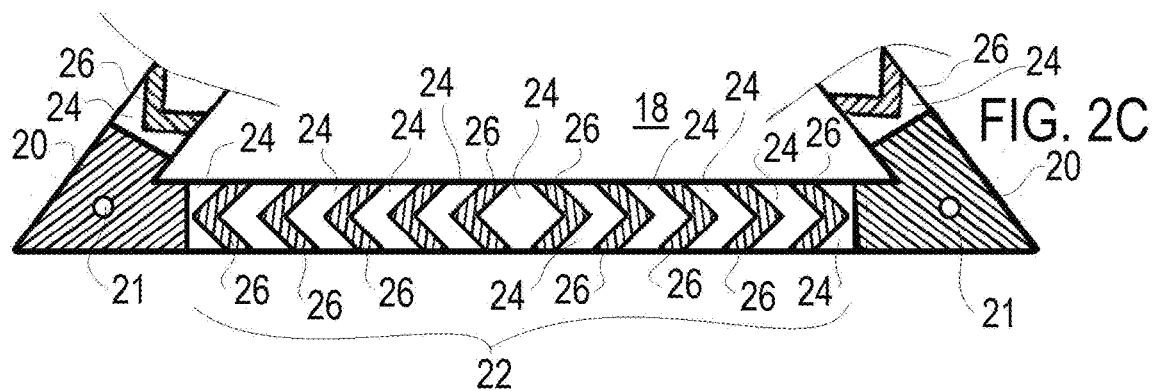

It is also possible to have the louvers 26 curved, undulating or wavy, or bent, such as forming a herringbone pattern in cross section as shown in FIG. 2C, wherein the plurality of passages 24 formed adjacent the vertical concrete louvers 26 are each non-linear passages forming a tortuous path for flow there through. FIG. 2C also shows that the direction of angle of the louvers 26 can change along the side 22.

Figure 2D:
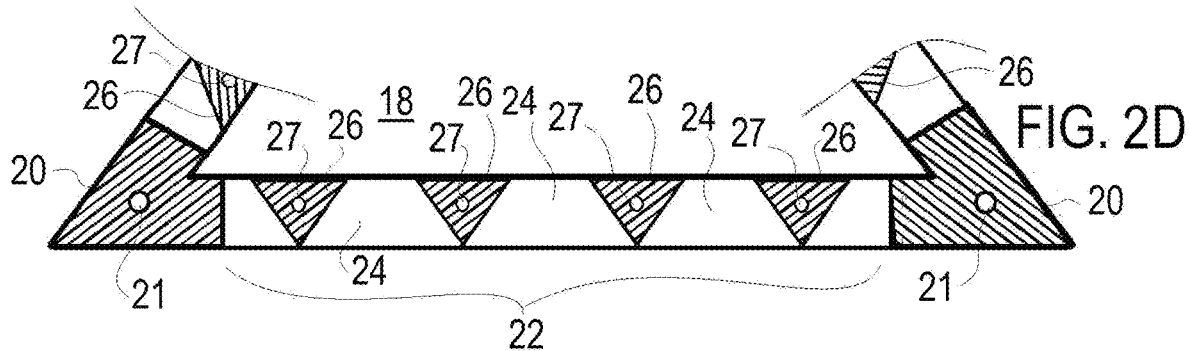

FIG. 2D is a cross sectional plan schematic view of a louver 26 embodiment of the apparatus 10 facilitating the formation of a vertical oyster reef according the present invention in which the louvers 26 are formed as triangular shapes that can also break the wave energy similar to the shape of the apparatus as a whole.

Figure 2E:
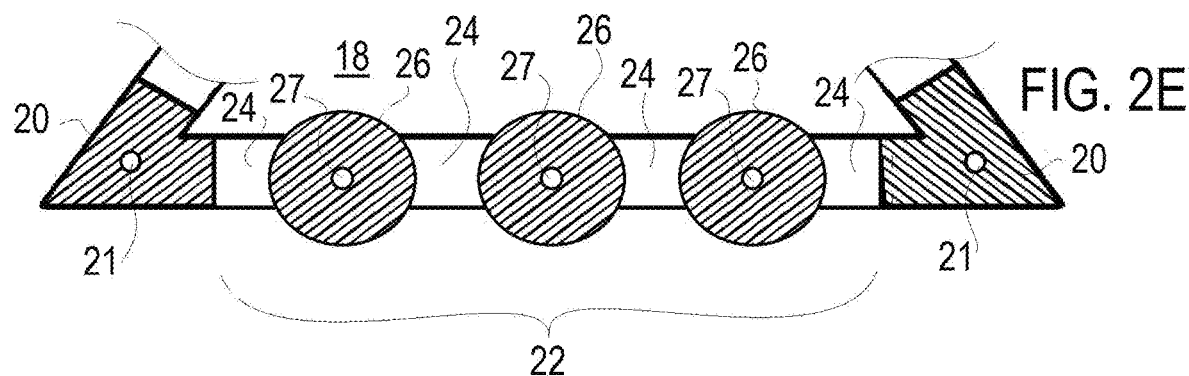

FIG. 2E is a cross sectional plan schematic view of a louver 26 embodiment of the apparatus 10 facilitating the formation of a vertical oyster reef according the present invention in which the louvers 26 are formed as circular cross sectional pillars. Here is shown that the louvers 26 can extend beyond the width of the other portions of the side 22. Additionally in this embodiment it is shown that for large enough louvers 26, the louvers 26 may also be reinforced with reinforced with internal reinforcement steel bars (rebar) 27 forming part of a rod sub-frame discussed below.

Figure 2F:
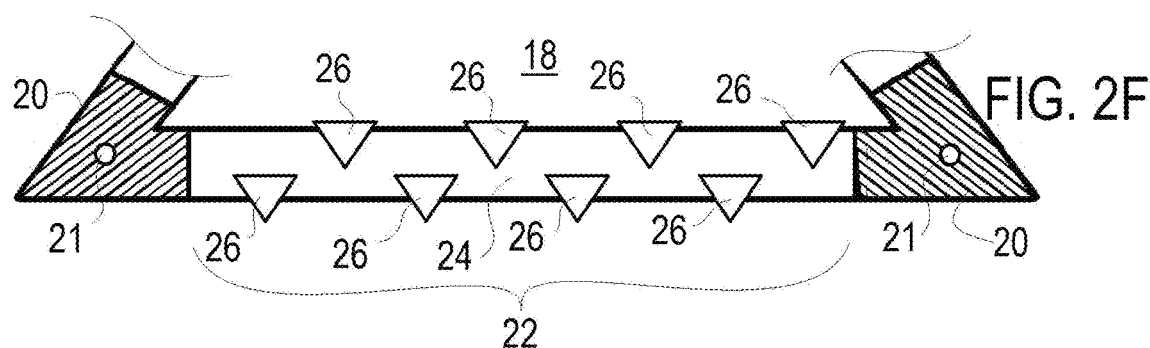
Figure 2G:
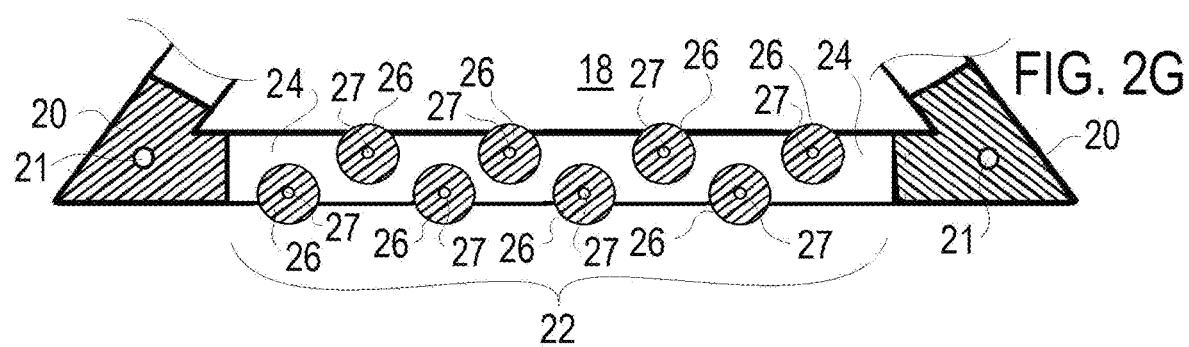
Figure 2H:
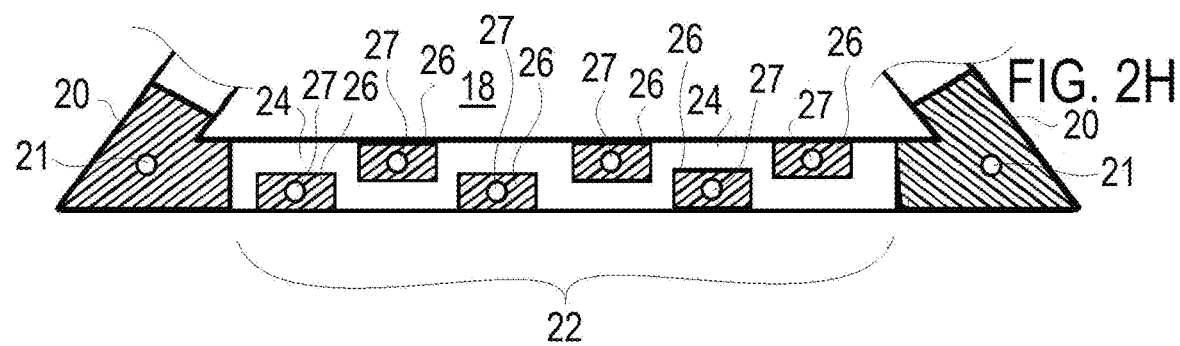

As another alternative the plurality of vertical concrete louvers 26 of each concrete side 22 is formed in an inner row and an outer row, and wherein the inner row and the outer row are staggered, as shown in the embodiments of FIGS. 2F-H. With two rows of louvers 26 it is possible to have the profiles of the louvers in the front and back rows overlap such that in side view there is an interrupted view of concrete.

In all the embodiments of the louvered apparatuses 10 the width of the passages 24 must be sufficient to allow waves to pass through to facilitate oyster growth, but not excessive amounts that might inhibit oyster growth such as minimize unwanted migration of loose cultch material 40, if present, from the cultch containment space 18, although a more tortuous path allows for a greater width of individual passage 26. In other words, the goal of the design of the louvers 24 is to allow the side 22 to attenuate the wave energy preventing damaging/growth inhibiting flow into the space 18 and still allow sufficient flow through the passages 24 to maintain a healthy establishment and growth to the oyster reef. The flow area measurement is a helpful measure of proper arrangement for the louvers 26 and passages 24. The apparatus facilitating the formation of a vertical oyster reef according to one embodiment of the invention provides a flow area of each side which is 20-75%. The flow area is calculated as a sum total area of a minimum flow area of each passage 24 of the side 22 divided by a total face surface of the side 22 times 100%. The face surface of the side 22 is the area bounded by and including the side posts 20 and the frame top 14 and the frame bottom 16 on one side.

The louvers 26 may be horizontal extending between the posts 20, or even formed at an angle. The louvers 26 (horizontal or vertical or angled) may also form the passages 26 to vary the flow rate with the height of the apparatus 10 via a change in passage size to better accommodate or match tidal forces as desired.

Loose Cultch Material 40 and Containment Bags 42

Figure 3A:
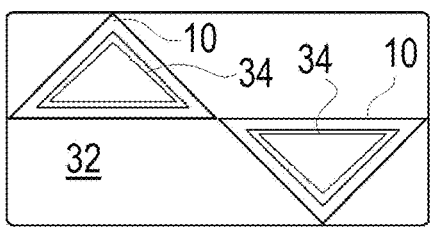
FIG. 3D is a schematic top plan view of another embodiment of an assembly of three apparatuses facilitating the formation of a vertical oyster reef according the present invention.
FIG. 3E is a schematic top plan view of the assembly of three apparatuses of FIG. 3D further including cultch material within cutch bags in one apparatus.

Loose cultch material 40 is that material 40 not incorporated into the concrete of the frame 12 (see FIG. 3A). Loose cultch material 40 is generally fossilized shell, coral, limestone rock, crushed concrete, or other similar materials produced by living organisms designed to provide points of attachment for oysters. Any desired and acceptable loose cultch material 40 may be used, if desired, within apparatus 10, although the desired cultch material 40 may alter the passage 26 construction, such as a change in minimal width or effective opening size. "Artificial" loose cultch materials 40 have even been proposed such as disclosed in U.S. Pat. Nos. 3,316,881 and 4,844,015 which are incorporated herein by reference, and these may also be used, if desired, in the apparatus 10. The cultch material 40 may also be site specific depending upon the particular restoration/rehabilitation project being implemented.

As noted above the present invention may also include integrated cultch material 40 within the concrete frame 12. The integrated cultch material 40 including at least one of oyster shell, fossilized sea shell, or fossilized crushed corral, and/or recycled rubber components. Cultch material 40 within the meaning of this specification will define the use of oyster shell, fossilized sea shell, or fossilized crushed corral, limestone, crushed concrete and/or recycled rubber components used in the integrated material 40 and the additional loose material 40 in the space 18 formed by fossilized shell, coral, limestone rock, crushed concrete, or other similar materials produced by living organisms designed to provide points of attachment for oysters.

Additionally the apparatus 10 according to the invention may further include the use of one or more, generally a plurality, of individual mesh bags 42 within the cultch containment space 18 and containing the cultch material 40. The bags 42, if used, are preferably formed of a mesh opening size and material commonly used in oyster cultivation and a material that can withstand the associated environmental conditions. Typically the bags 42 will be plastic material having mesh openings of about 1¼", although changes to such mesh opening sizes directed to optimizing the oyster production in a given marine environment are contemplated. Non-plastic materials, if cost effective alternatives are found, may also be preferable, but the functional aspects define the suitable materials. An inner rebar frame within the cultch containment space 18 could be used to position the bags in a desired location. However in a preferred embodiment no added inner frame nor bags 42 are utilized even if loose cultch material is utilized in space 18.

The Applicant's prior '502 publication and '975 publication teach suitable loose cultch material 40 and bag 42 construction and are incorporated herein by reference.

As discussed above cultch material 40 may be integrated into the concrete forming the frame, such that no loose cultch material is needed. FIG. 3E shows the use of three bags 42 filled with cultch material 40 wherein each bag generally aligns with one side 22 of the apparatus 10. Other numbers and orientations of bags 42 are possible. Further loose cultch material may be placed into the space 18 as another alternative. Further the present invention may have no loose cultch material 40 and rely upon the integrated cultch material 40 within the concrete forming the frame 12 or merely the concrete construction of the frame 12 itself.

Vertical Stacking

The apparatus 10 facilitating the formation of a vertical oyster reef according to the present invention is configured for vertical stacking and includes a top extension member 28 coupled to the frame top 14 and configured to be received within a recess in the frame bottom 16 of a vertically adjacent apparatus 10. The extension member 28 and recess allows for secure coupling and for a modular system allowing for higher systems to be easily built and installed. The extension member 28 may be integral with the frame 12 as shown in FIG. 1A or separate therefrom as shown in FIG. 1C. If separate then the frame top 14 may include a recess and stop 30 for receiving the separate member 28 therein, similar to the recess in the frame bottom 16. As shown in FIG. 1C the extension member 28 may include passages in the sides thereof to act in a similar fashion as passages 24 of the sides 22.

Assembly 100

Another aspect of the invention provides an assembly 100 facilitating the formation of a vertical oyster reef including a plurality of concrete wave attenuating frames 12 and a coupler, such as base 32 with a plurality of extensions 34, connecting the plurality of concrete wave attenuating frames 12 in a desired orientation. As an alternative to the separate base 32 with extensions 34, the base 32 may be formed integral with the frames 12.

Figure 4A:
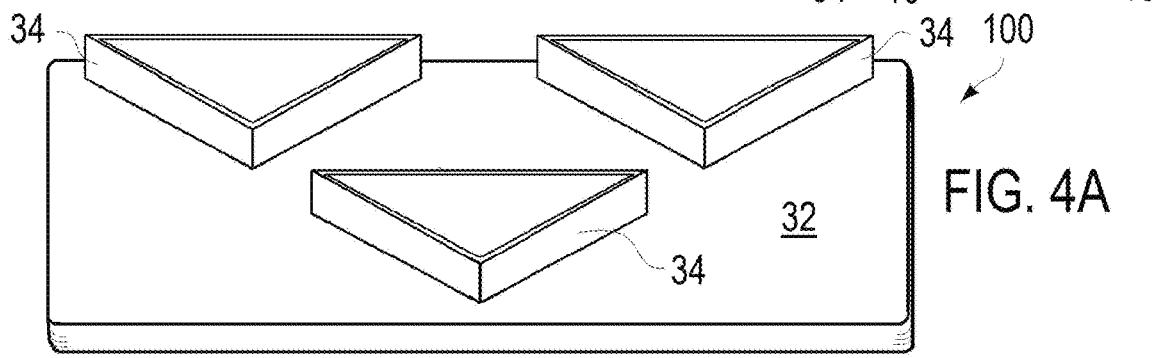
FIG. 4A is a schematic perspective view of a base used in the assembly of three apparatuses of FIGS. 3D and 3E.
Figure 5:
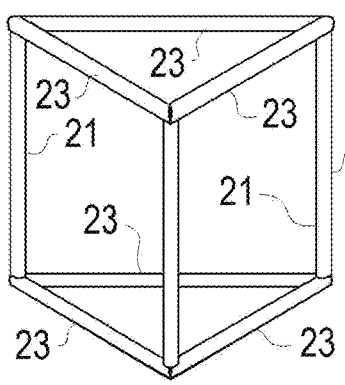
FIG. 5 is a schematic perspective view of an integral one-piece support rod sub-frame used in forming several of the apparatuses of the present invention.
Figure 4B:
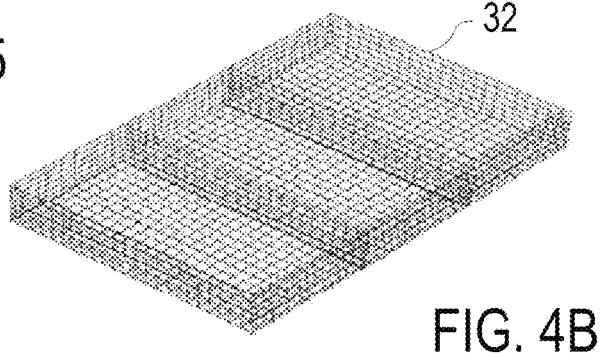
FIG. 4B is a schematic perspective view of a gabion style base used in the assemblies of the present invention.

The base 32 may be a reinforced concrete pad or possibly a gabion style mat as shown in FIG. 4B (in which extensions 34 are removed for clarity). The gabion style mat would allow some slight flexibility for the base 32 to conform to the sea bed for a better support of the apparatuses 10 of the assembly 100. The base 32 allows for easier installation of the reef configuration in practice. The base 32 does not extend significantly beyond the apex of any apparatus 10 supported thereon to allow adjacent assemblies 100 to be placed in the desired proximity to form the desired artificial reef configuration. The base 32 may include lift points, such as steel eyelets coupled directly to reinforcing rods therein, near the corners to further facilitate lifting and placing the assembly by cranes.

The base 32 includes of base extensions 34 to allow for the coupling of multiple apparatus 10 together in an adjacent integrated unit fashion forming the assembly 100. The base extension 34 is a raised triangular area analogous to the member 28 and configured to be received in the recess of the frame bottom 16 for securely holding the apparatus on the base 32.

FIG. 3A illustrates a "bow-tie" configuration for assembly 100, which has been proven to be stable in marine environments. This bow-tie" configuration for the assembly 100 includes two frames 12 and the desired orientation includes a corner of one frame 12 adjacent the corner of another adjacent frame 12, and one side 22 of each of the frame 12 with the adjacent corners extending along a common line away from the adjacent corners in opposite directions to a second corner of each frame 12, with third corners of the two frames 12 being on opposite sides of the common line.

Figure 3B:
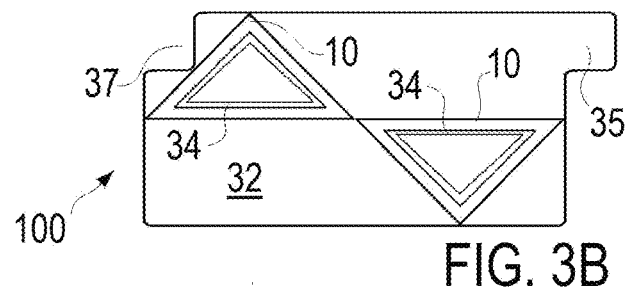

FIG. 3B illustrates another "bow-tie" configuration for assembly 100 but further including and extension 35 and associated recess 37 in the base 30 to facilitate the interlocking of adjacent bases 30 when forming a long reef structure of adjacent assemblies 100. The extension 35 and recess 37 may accommodate some play to allow for a slight arc to be added to a long line of the assemblies 100.

Figure 3C:
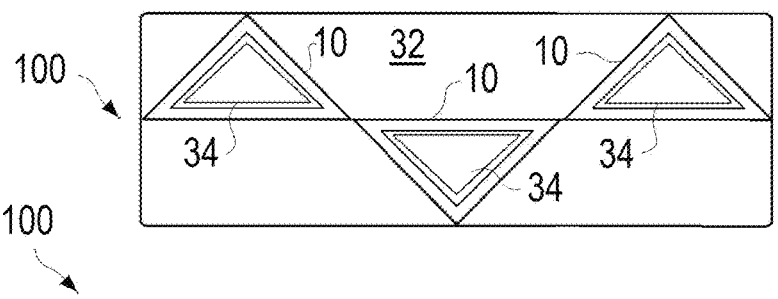

FIG. 3C illustrates a "saw tooth" configuration for assembly 100 wherein the assembly 100 includes three frames 12 that can be defined as two adjacent "bow-tie" configurations of FIG. 3A using a common intervening apparatus 10 for both "bow-ties". The saw tooth configuration may also include projections 35 and recesses 37 to interlock the bases 30 of a line of assemblies 100, however it is envisioned that a line of saw tooth assemblies would likely have adjacent assemblies 100 pivoted 180 degrees to maintain the even saw tooth configuration for the reef.

Figure 3D:
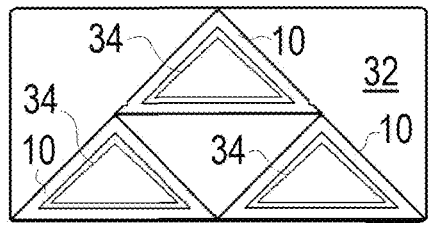
Figure 3E:
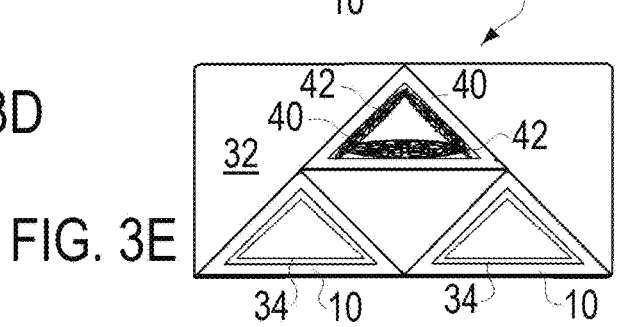

FIGS. 3D and E (and the base 30 of FIG. 4A) shows a "triangular" configuration for assembly 100 that uses of three apparatuses 10 that are coupled together in a larger equilateral triangle whereby two apparatus 10 form the base and one apparatus 10 forms the apex, with each side having twice the length of each individual apparatus 10 side length.

In certain implementations, a cap structure similar to base 30 may be used on the top of the apparatuses 10 of the assembly 100 to further couple assemblies 10 together. The cap may include recesses to receive extensions 28 or may include extensions received within either the integral extensions 28 or into recess 30 of the frame top 14. The cap may serve as a base for above water structures, such as a dock, above water platform, artificial bird rookery, barge support or the like.

Reinforced Frame 12

The present invention provides wherein the posts 20 and frame top 14 and frame bottom 16, at least, may be reinforced with internal reinforcement steel bars (rebar) 21 and 23. Rebar (short for reinforcing bar), also known as reinforcing steel and reinforcement steel, is historically a common steel bar often used as a tension device in reinforced concrete and reinforced masonry structures, to strengthen and hold the concrete in compression. The surface of the rebar has often been patterned generally to form a better bond with the concrete. Generally ⅜" to ¾" (imperial bar size #6 Metric "soft" size #19) steel bars, with ½" (imperial bar size #4 Metric "soft" size #13) and ⅝" (imperial bar size #5 Metric "soft" size #16) being preferred for frame 12 if the posts 20 and or frame top 14 or frame bottom 16.

Specifically, an integral one-piece support rod sub-frame is formed by bending and welding suitable rebar rods including a rods 23 forming a closed loop top sub-frame, rods 23 forming a closed loop bottom sub-frame and substantially vertically extending rods 21 coupled between the top sub-frame and the bottom sub-frame. The frame 12 is formed by encapsulating the sub-frame in concrete in a mold or by spraying the integral sub-frame. Depending upon the size to the louvers 26, additional rods 27 may be included within louvers 26. For the grid design such as FIGS. 1B and C a mesh wire grid may be coupled between the rods 21 to reinforce the side 22. The frame 12 may include lift points to allow a crane to easily couple to the frame, and if used it is preferable if they extend to and couple to the one piece support rod sub-frame.

Incubated Reefs

The present invention yields a method of forming a vertical oyster reef incorporating a concrete wave attenuating apparatus 10 comprising the steps of: A) providing a concrete wave attenuating frame 12 B) positioning the frame 12 and optionally loose cultch material 40 within an oyster hatchery tank during an incubation period; C) propagating live oyster larvae from brood stock oysters within the hatchery tank and feeding the larvae a mixture of algae during the incubation period until the larvae are mature enough to set on the frame and on the cultch material 40 (if present); and D) removing the frame 12 and cultch material 40 (if present) and set larvae from the hatchery tank following the incubation period and placing the frame 12 (such as formed in an assembly 100) in a marine environment suitable to support an oyster reef.

The hatchery tank, in one embodiment of the present invention, may be formed in-situ in the marine environment as a protective temporary wall around the frame 12, or frames 12 of assembly 100, after the frame 12 or assembly 100 is placed in a desired location. The temporary tank is used until the larvae are set on the frame (and loose material 40 if used), and then removed after the incubation period.

Shoreline Rehabilitation

This invention is also directed to cost effective, efficient methods for shoreline rehabilitation utilizing induced vertical oyster reefs and associated lagoons from designated placement of apparatus 10 typically assemblies 100, grouped into configurations and aligned in contiguous segments with intervening tidal pass to form lagoons under natural processes. This general approach is detailed in Applicant's prior '502 publication and '975 publication and the present invention builds upon, and is designed to increase the effectiveness of earlier oyster reef restoration concepts. The goal is to sustain and rehabilitate the initial shore line by reducing locally generated wave energy impinging on relatively sheltered shorelines.

The opportunity to restore a zone of highly productive oyster-dominated near-shore lagoon habitat is also valuable. The invention described effectively expands the tidal zone and may include a formed lagoon and the tidal pass. As discussed in Applicant's prior '502 publication and '975 publication, this can be an extremely useful area for recreational and commercial purposes as it is a desirable intertidal habitat.

It is apparent that many variations to the present invention may be made without departing from the spirit and scope of the invention. The present invention is defined by the appended claims and equivalents thereto.

What is claimed is:

1. An apparatus facilitating the formation of a vertical oyster reef comprising:
   A) a concrete wave attenuating frame having
      i) a concrete frame top and a concrete frame bottom defining a periphery of the frame, each having corners and sides extending between the corners, wherein the corners of the concrete frame top are generally aligned with the corners of the concrete frame bottom and the sides of the concrete frame top are generally aligned with the sides of the concrete frame bottom,
      ii) concrete corner posts extending generally vertically between the generally aligned corners of the concrete frame top and the concrete fame bottom,
      iii) concrete side members between the concrete corner posts extending generally vertically between the generally aligned sides of the concrete frame top and the concrete bottom frame, with a plurality of passages extending through the concrete side members, and wherein a flow area of each side is 20-75%, wherein the flow area is a sum total area of a minimum flow area of each passage of the side divided by a total face surface of the side times 100%$_1$ wherein the frame is generally triangular in horizontal cross section and includes three of the concrete corner posts, and wherein each concrete side member is formed by a plurality of vertical concrete louvers extending between the concrete frame top and the concrete frame bottom, and wherein the plurality of passages are formed adjacent the vertical concrete louvers;
   B) a cultch containment space at a geometric center of the concrete wave attenuating frame defined radially within the concrete wave attenuating frame, wherein the plurality of passages extend to the cultch containment space; and C) cultch material within the cultch containment space.

2. The apparatus facilitating the formation of a vertical oyster reef according to claim 1 wherein the plurality of vertical concrete louvers extend substantially at an angle to a plane of the concrete side member.

3. The apparatus facilitating the formation of a vertical oyster reef according to claim 2 wherein the plurality of vertical concrete louvers extend substantially perpendicular to the plane of the concrete side member.

4. The apparatus facilitating the formation of a vertical oyster reef according to claim 1 wherein the plurality of vertical concrete louvers of each concrete side member is formed in an inner row and an outer row, and wherein the inner row and the outer row are staggered.

5. The apparatus facilitating the formation of a vertical oyster reef according to claim 1 wherein the plurality of passages formed adjacent the vertical concrete louvers are each non-linear passages.

6. The apparatus facilitating the formation of a vertical oyster reef according to claim 1 further including a plurality of individual mesh bags within the cultch containment space and containing the cultch material.

7. The apparatus facilitating the formation of a vertical oyster reef according to claim 1 wherein the apparatus is configured for vertical stacking and includes a triangular top extension member coupled to the concrete frame top and configured to be received within the concrete frame bottom of a vertically adjacent apparatus.

8. The apparatus facilitating the formation of a vertical oyster reef according to claim 1 wherein at least the corner post and the concrete frame top and concrete frame bottom include internal reinforcement steel bars.

9. The apparatus facilitating the formation of a vertical oyster reef according to claim 1 wherein the concrete frame includes material integrated therein to perpetuate the growth of oysters, bryozoans, barnacles, or other marine organisms including at least one of oyster shell, fossilized sea shell, or fossilized crushed corral, and/or recycled rubber components.

10. The apparatus facilitating the formation of a vertical oyster reef according to claim 1 further including a concrete base with at least one raised triangular area configured to be received in the concrete frame bottom.

11. An assembly facilitating the formation of a vertical oyster reef comprising:

A) a plurality of concrete wave attenuating frames, each frame having
  i) a concrete frame top and a concrete frame bottom defining a periphery of the frame, each having corners and sides extending between the corners, wherein the corners of the concrete frame top are generally aligned with the corners of the concrete frame bottom and the sides of the concrete frame top are generally aligned with the sides of the concrete frame bottom,
  ii) concrete corner posts extending generally vertically between the generally aligned corners of the concrete frame top and the concrete fame bottom,
  iii) concrete side members between the concrete corner posts extending generally vertically between the generally aligned sides of the concrete frame top and the concrete fame bottom frame, with a plurality of passages extending through the concrete side members, and wherein a flow area of each side is 20-75%, wherein the flow area is a sum total area of a minimum flow area of each passage of the side divided by a total face surface of the side times 100%, and wherein each frame is generally triangular in horizontal cross section and includes three of the concrete corner posts, and wherein each concrete side member is formed by a plurality of vertical concrete louvers extending between the concrete frame top and the concrete frame bottom, and wherein the plurality of passages are formed adjacent the vertical concrete louvers,
  iv) a space at a geometric center of the concrete wave attenuating frame defined radially within the concrete wave attenuating frame, wherein the plurality of passages extend to the space;

B) a coupler connecting the plurality of concrete wave attenuating frames in a desired orientation.

12. The assembly facilitating the formation of a vertical oyster reef according to claim 11 wherein the assembly includes at least two of the frames and the desired orientation includes a corner of one frame adjacent the corner of another adjacent frame, and one side of each of the frames with the adjacent corners extending along a common line away from the adjacent corners in opposite directions to a second corner of each frame, with third corners of the two frames with adjacent corners being on opposite sides of the common line.

13. The assembly facilitating the formation of a vertical oyster reef according to claim 11 wherein the assembly includes three of the frames and the desired orientation includes coupling the three frames into a larger equilateral triangle wherein two frames form the base and one frame forms the apex, and wherein each side of the larger equilateral triangle has twice the length of each individual frame side length.

14. The assembly facilitating the formation of a vertical oyster reef according to claim 11 wherein the coupler connecting the plurality of concrete wave attenuating frames in a desired orientation includes a concrete base with a plurality of raised triangular areas each configured to be received in one frame bottom for orientating the frame.

15. A method of forming a vertical oyster reef incorporating a concrete wave attenuating apparatus comprising the steps of:

A) forming an integral one-piece support rod sub-frame including the rods forming a closed loop top sub-frame, and the rods forming a closed loop bottom sub-frame and with substantially vertically extending rods coupled between the top sub-frame and the bottom sub-frame;

B) encapsulating the sub-frame in concrete forming a frame of a concrete wave attenuating apparatus which includes
  i) a concrete frame top and a concrete frame bottom defining a periphery of the frame, each having corners and sides extending between the corners, wherein the corners of the concrete frame top are generally aligned with the corners of the concrete frame bottom and the sides of the concrete frame top are generally aligned with the sides of the concrete frame bottom,
  ii) concrete corner posts extending generally vertically between the generally aligned corners of the concrete frame top and the concrete fame bottom,
  iii) concrete side members between the concrete corner posts extending generally vertically between the generally aligned sides of the concrete frame top and the concrete fame bottom frame, with a plurality of passages extending through the concrete side members and wherein a flow area of each side is 20-75%, wherein the flow area is a sum total area of a minimum flow area of each passage of the side divided by a total face surface of the side times 100%, and wherein each frame is generally triangular in horizontal cross section and includes three of the concrete corner posts, and wherein each concrete side member is formed by a plurality of vertical concrete louvers extending between the concrete frame top and the concrete frame bottom, and wherein the plurality of passages are formed adjacent the vertical concrete louvers, iv) a space at a geometric center of the concrete wave attenuating frame defined radially within the concrete wave attenuating frame, wherein the plurality of passages extend to the space; and C) Placing the frame in a marine environment suitable to support an oyster reef.

16. The method of forming a vertical oyster reef of claim 15 further including the step of B1) positioning the frame within an oyster hatchery tank during an incubation period; B2) propagating live oyster larvae from brood stock oysters within the hatchery tank and feeding the larvae a mixture of algae during the incubation period until the larvae are mature enough to be set on the frame; and B3) removing the frame and set larvae assembly unit from the hatchery tank following the incubation period prior to the step C) of placing the frame in a marine environment suitable to support an oyster reef.

* * * * *